(12) United States Patent
Liu et al.

(10) Patent No.: US 10,576,926 B2
(45) Date of Patent: Mar. 3, 2020

(54) SAFETY BELT CENTRAL ADJUSTER

(71) Applicant: NINGBO SOTER SAFETY CO. LTD., Ningbo (CN)

(72) Inventors: Hongchi Liu, Ningbo (CN); Yi Zhu, Ningbo (CN); Qinbing Ma, Ningbo (CN)

(73) Assignee: NINGBO SOTER SAFETY CO. LTD., Ningbo (CN)

( * ) Notice: Subject to any disclaimer, the term of this patent is extended or adjusted under 35 U.S.C. 154(b) by 16 days.

(21) Appl. No.: 15/894,992

(22) Filed: Feb. 13, 2018

(65) Prior Publication Data

US 2019/0118762 A1 Apr. 25, 2019

(30) Foreign Application Priority Data

Oct. 25, 2017 (CN) .......................... 2017 1 1005253

(51) Int. Cl.
*B60R 22/30* (2006.01)
*B60N 2/28* (2006.01)

(52) U.S. Cl.
CPC ............ *B60R 22/30* (2013.01); *B60N 2/2812* (2013.01); *B60N 2002/2815* (2013.01); *B60N 2002/2818* (2013.01)

(58) Field of Classification Search
CPC ..... B60R 22/30; B60R 22/105; B60N 2/2812; B60N 2002/2818; B60N 2002/2815; B60N 2/2803; B60N 2/265
See application file for complete search history.

(56) References Cited

U.S. PATENT DOCUMENTS

| | | | | |
|---|---|---|---|---|
| 5,286,090 A | * | 2/1994 | Templin | A44B 11/2549 297/250.1 |
| 5,291,638 A | * | 3/1994 | Huang | A44B 11/14 24/170 |
| 5,920,963 A | * | 7/1999 | Chou | F16G 11/106 24/170 |
| 6,543,096 B2 | * | 4/2003 | Settelmayer | A44B 11/12 24/170 |
| 6,560,825 B2 | * | 5/2003 | Maciejczyk | A44B 11/14 24/170 |
| 8,327,507 B2 | * | 12/2012 | Eisinger | B60N 2/2812 24/168 |
| 9,775,410 B2 | * | 10/2017 | Szewczyk | A44B 11/125 |
| 9,936,770 B2 | * | 4/2018 | Tsai | A44B 11/12 |

FOREIGN PATENT DOCUMENTS

| | | |
|---|---|---|
| CN | 203913651 U | 11/2014 |
| CN | 107444333 A | 12/2017 |

\* cited by examiner

*Primary Examiner* — Robert Sandy
*Assistant Examiner* — Louis A Mercado
(74) *Attorney, Agent, or Firm* — Innovation Capital Law Group, LLP; Vic Lin (57) ABSTRACT

A safety belt central adjuster, which has a main body, a press plate and a connecting piece, wherein the press plate and the main body are connected in a hinged mode through the connecting piece, and the press plate can rotate around the connecting piece; at least one spring mechanism used for ensuring the tightening force of the press plate is arranged at the hinged joint of the press plate and the main body, and a ratchet part is arranged at the lower end of the press plate and provided with round sharp reverse teeth; the ratchet part disengages from the main body, and a channel allowing a safety belt to stretch therein is formed between the ratchet part and the main body.

9 Claims, 7 Drawing Sheets

SAFETY BELT CENTRAL ADJUSTER

CROSS-REFERENCE OF RELATED APPLICATIONS

This application claims priority under 35 USC§ 119 to Chinese Patent Application No. 201711005253.8, filed on Oct. 25, 2017. The disclosure of the above-identified applications is hereby incorporated by reference.

TECHNICAL FIELD

This invention belongs to the technical field of safety seats, and particularly relates to a safety belt central adjuster applied to child safety seats.

DESCRIPTION OF RELATED ART

Child safety seats are connected to vehicular seats (such as automobiles), and children are restrained by child safety seats through binding devices. Child safety seats can lower the probability of injuries to children under emergency braking or accidental collisions and thus are accepted and widely used by customers. Automobile manufacturers can directly integrate child safety seats into vehicles during design, but more commonly, child safety seats are purchased and installed by customers. In many regions in developed European and American countries, child safety seats approved by governments are required to be used when children at specific ages and with specific weights and/or heights sit in vehicles. Child safety seats can provide a passive limiting structure and must be used correctly to achieve the expected effects. Child safety seats are generally provided with safety belts, and the safety belts are safety devices used for fixing and restraining children and protecting children against injuries in collisions or in an emergency stop. For many child safety seats, the safety belts can be extended through central adjusters on the front portion, and thus children with different body shapes can sit in the safety seats conveniently. Furthermore, the safety belts can be shortened so that children can be stably restrained by the safety seats. Although the central adjusters in the prior art can lock safety belts after the safety belts are extended or shortened, when children are restrained by the safety seats, buckle teeth used for locking the safety belts can be fractured due to the unreasonable structural design, and consequentially the safety belts cannot be locked by the buckle teeth, the locking reliability is extremely poor, and the safety belts disengage frequently. Meanwhile, the reliability and service life of the rebound mechanism are poor during locking, the whole central adjuster cannot be used anymore after being used several times, and more severely, fractures can be caused in traffic accidents due to poor tension. The existing central adjusters are complex in overall structural design and high in manufacturing cost, and thus improvements to the existing safety belt central adjusters are necessary.

BRIEF SUMMARY OF THE INVENTION

To overcome the defects of the prior art, the invention provides a safety belt central adjuster which is simple in structure, long in service life, good in reliability and low in manufacturing cost.

According to the technical scheme adopted by the invention for solving the above technical problems: the safety belt central adjuster comprises a main body, a press plate and a connecting piece, wherein the press plate and the main body are connected in a hinged mode through the connecting piece, and the press plate can rotate around the connecting piece; at least one spring mechanism used for ensuring the tightening force of the press plate is arranged at the hinged joint of the press plate and the main body, and a ratchet part is arranged at the lower end of the press plate and provided with round sharp reverse teeth; the safety belt central adjuster has a locked state and a released state when a safety belt stretches into the safety belt central adjuster; when the safety belt central adjuster is in the locked state, a lock space used for locking the position of the safety belt is formed between the ratchet part and the upper surface of the main body, the safety belt central adjuster is switched to the released state when external force is applied to the press plate, the ratchet part can disengage from the main body, and a channel allowing the safety belt to stretch therein is formed between the ratchet part and the main body.

The safety belt central adjuster of the invention is mainly installed in the middle of the front end of a child safety seat in use and mainly used for locking and releasing the safety belt when the length of the safety belt is adjusted; as the press plate and the main body are connected in the hinged mode through the connecting piece, the press plate is operated to be switched to the released state from the locked state first, the length of the safety belt is adjusted after the safety belt stretches into the channel, the press plate is released after the safety belt is adjusted to the proper length, and then the press plate generates restoring force and returns to the locked state under the effect of the spring mechanism. One innovation of the invention lies in that the ratchet part is located at the position, where the safety belt is locked, of the lower end of the press plate. However, in the prior art, sharp teeth are generally adopted, as the sharp teeth are extremely pointed, all force is concentrated on the sharp teeth when the sharp teeth make contact with the safety belt, each sharp tooth is actually a point and thus is likely to be broken when force is applied to the point, and consequentially, the whole position where the safety belt is locked is weak. In this patent, the ratchet part is composed of multiple round sharp reverse teeth, namely the ratchet part is an arc and has a certain anti-disengaging chamfer when making contact with the safety belt. In this way, when the arc teeth make contact with the safety belt, force applied to the arc points can be dispersed, so that the acting force applied to the ratchet part is reduced, and the whole safety belt central adjuster can bear a force over 1000 pounds more uniformly, locking is firmer, and the strength is high. In this way, users can adjust the safety belt only by pressing or releasing the press plate, operation is simple, and working efficiency is high.

According to the safety belt central adjuster of the invention, a lower concave arc part is arranged on the portion, matched with the ratchet part, of the upper surface of the main body, and the lower surface of the main body protrudes outwards to form the lower concave arc part; a lock space used for locking the position of the safety belt is formed between the lower concave arc part and the ratchet part, the arc shape of the lower concave arc part is kept consistent with that of the arc surface formed by the multiple sharp round reverse teeth of the ratchet part at the lower end of the press plate, and when the safety belt central adjuster is in the locked and stressed state, the safety belt is locked on the lower concave arc part by the ratchet part.

According to the safety belt central adjuster of the invention, the ratchet part comprises a plurality of round sharp reverse teeth, the multiple round sharp reverse teeth are arranged obliquely to form an anti-disengaging chamfer, the safety belt can disengage out in the direction of the anti-disengaging chamfer, and when the safety belt central adjuster is in the locked and stressed state, the safety belt is locked on the lower concave arc part by at least three round sharp reverse teeth in the middle.

Another innovation of the invention lies in that when the safety belt central adjuster is in the locked state, the safety belt is locked on the lower concave arc part by at least three round sharp reverse teeth in the middle. However, in the prior art, two teeth generally act on the safety belt. In the invention, the safe lock position can be ensured through the lower concave part, and meanwhile, as the three round sharp reverse teeth in the middle act on the safety belt, the engaging force of the press plate to the safety belt in the middle is ensured, the overall strength is higher, and the position of the safety belt is locked; the other round sharp reverse teeth on the two sides can prevent the safety belt from disengaging out, so that the locking reliability and stability are ensured; the multiple oblique round sharp reverse teeth form the anti-disengaging chamfer and can obliquely act on the safety belt, the safety belt disengages out right in the inclination direction of the round sharp reverse teeth, and thus the locking effect is better.

According to the safety belt central adjuster of the invention, each round sharp reverse tooth is composed of a first arc surface part, a second arc surface part and a round tooth part, wherein the arc length of the second arc surface part is greater than that of the first arc surface part, and the round tooth part is connected between the first arc surface part and the second arc surface part. In this way, the round tooth parts with arcs of all the round sharp reverse teeth can be formed, force can be dispersed when applied to the round tooth parts, the force transmission direction is changed accordingly, and the whole safety belt central adjuster can be locked more firmly and has high strength.

According to the safety belt central adjuster of the invention, in total the ratchet part includes seven round sharp reverse teeth, namely the first round sharp reverse tooth, the second round sharp reverse tooth, the third round sharp reverse tooth, the fourth round sharp reverse tooth, the fifth round sharp reverse tooth, the sixth round sharp reverse tooth and the seventh round sharp reverse tooth, and when the safety belt central adjuster is in the locked and stressed state, the safety belt is locked on the lower concave arc part by the third round sharp reverse tooth, the fourth round sharp reverse tooth and the fifth round sharp reverse tooth.

As an optimization of the safety belt central adjuster of the invention, two spring mechanisms used for ensuring the tightening force of the press plate are arranged at the hinged joint of the press plate and the main body and each comprise a spring, and each spring comprises a sleeve part, an inner clamping stop lever part and an outer clamping hook part; the sleeve parts are arranged on the connecting piece in a sleeving mode, the inner clamping stop lever parts are clamped on the press plate, and the outer clamping hook parts are hooked on the two sides of the main body.

Another innovation of the invention lies in spring arrangement. In the prior art, one spring is generally directly arranged on a connecting piece in a sleeving mode integrally, then one outer end of the spring stretches out from holes, and the holes need to be aligned during assembling. However, in the invention, the springs are provided with the outer clamping hook parts on the outer side and directly hooked on the two sides of the main body through the outer clamping hook parts, and thus compared with the prior art, assembling is more convenient, and the production efficiency is improved. Furthermore, as an optimization of the invention, the two sides of the connecting piece are each provided with one spring, so that a dual protection effect is achieved, the whole safety belt central adjuster can still operate normally even if the spring on one side fails, accordingly, the reliability of the safety belt central adjuster in use is ensured, and the service life of the safety belt central adjuster is longer.

As an optimization of the safety belt central adjuster of the invention, each sleeve part is composed of a plurality of spring windings, moving gaps are reserved between the adjacent spring windings, and thus the springs can still have good elasticity after being used repeatedly; the springs can be movably adjusted through the moving gaps, and thus the service life of the springs can be remarkably prolonged.

According to the safety belt central adjuster of the invention, a fixed through-hole is formed in the press plate and comprises a first through-hole part and a second through-hole part which are communicated with each other; the sleeve part of each spring is arranged on the connecting piece in the sleeving mode and located in the first through-hole part together with the connecting piece, the inner clamping stop lever part of each spring stretches to the second through-hole part, and a pressing protrusion used for pressing down each inner clamping stop lever part is arranged between the first through-hole part and the second through-hole part. The first through-hole part and the second through-hole part are mainly used for conveniently installing the connecting piece and fixing the position of the inner clamping stop lever of each spring; for ensuring a certain restoring force of each spring, both ends of the spring need to be fixed, namely both the inner clamping stop lever part and the outer clamping hook part need to be fixed, the position of the inner clamping stop lever part is fixed when the pressing protrusion acts on the inner clamping stop lever part, and thus it is ensured that the lock tightening force can be generated subsequently.

As an optimization of the safety belt central adjuster of the invention, the distances from the round tooth parts of the seven round sharp reverse teeth to the center of the fixed through-hole are sequentially increased from left to right, specifically, the distance from the round tooth part of the second round sharp reverse tooth to the center of the fixed through-hole is 6.63+/−0.1, the distance from the round tooth part of the third round sharp reverse tooth to the center of the fixed through-hole is 7.39+/−0.1, the distance from the round tooth part of the fourth round sharp reverse tooth to the center of the fixed through-hole is 7.98+/−0.1, the distance from the round tooth part of the fifth round sharp reverse tooth to the center of the fixed through-hole is 8.56+/−0.1, the distance from the round tooth part of the sixth round sharp reverse tooth to the center of the fixed through-hole is 9.32+/−0.1, and the distance from the round tooth part of the seventh round sharp reverse tooth to the center of the fixed through-hole is 10.08+/−0.1. As the distances from the round tooth parts of the seven round sharp reverse teeth to the center of the fixed through-hole are sequentially decreased from left to right, a certain anti-disengaging chamfer is formed by the round sharp reverse teeth, the engaging force of all of the round sharp reverse teeth is enhanced, and accordingly the safety belt central adjuster can bear higher force more uniformly.

As an optimization of the safety belt central adjuster of the invention, a reinforced limiting component is further arranged on the connecting piece, the reinforced limiting component is arranged on the connecting piece in a sleeving mode and located in the first through-hole part together with the connecting piece, and the sleeve part of each spring is arranged on the reinforced limiting component in a sleeving mode; a stop limiting part is located in the middle of the reinforced limiting component, and the inner side of each sleeve part abuts against the stop limiting part. The connecting piece needs to be rotated repeatedly in use, and for improving the strength of the connecting piece, the reinforced limiting component is arranged at the outer end of the connecting piece in the sleeving mode and mainly has two functions; for one function, the strength of the connecting piece is improved, and fractures are prevented; for the other function, the springs are prone to sliding along the connecting piece in use due to the fact that the inner sides of the springs are not limited, however, by adoption of the stop limiting part, the springs can be stopped, the positions of the springs are limited and fixed, and thus the locking reliability is ensured. Meanwhile, through the reinforced limiting component, the situation that the springs are damaged due to direct friction between the springs and the connecting piece in the pressing process, and consequentially the service life of the springs is shortened can be prevented.

According to the safety belt central adjuster of the invention, reinforced protrusion parts are formed on the two sides of the main body, receding spaces are formed between the inner sides of the reinforced protrusion parts and the press plate, and reinforced protrusions are formed outside the reinforced protrusion parts; the reinforced protrusion parts are provided with hook grooves, and the outer clamping hook parts are hooked in the hook grooves. The reinforced protrusion parts mainly have two functions; for one function, the receding spaces are formed, and thus the outer clamping hook parts can smoothly stretch out from the receding spaces when the springs are installed; for the other function, the strength of the main body is improved when the main body is stressed, and thus the main body is not prone to deformation. The outer clamping hook parts are hooked in the hook grooves at the angle of 45-50 degrees, and thus the overall elasticity is optimal; the hook grooves are mainly used for fixing the outer clamping hook parts of the springs, and the inner clamping stop lever parts of the springs are fixed through the second through-hole part so that under the condition that both ends of each spring are fixed, elastic tightening force can be generated and then acts on the press plate, and thus the safety belt is locked.

According to the safety belt central adjuster of the invention, a lower guide groove is further formed in the main body and located on the guide-out side of the position where the safety belt is locked, and a lower guide arc edge is located on one side of the lower guide groove. The safety belt can be guided to the lower end through the lower guide groove so as to be adjusted and fixed conveniently.

According to the safety belt central adjuster of the invention, an operating part is arranged on the upper side of the press plate and provided with friction-increasing protrusions. The friction force for operating the press plate can be increased through the friction-increasing protrusions so that the press plate can be operated conveniently, and slipping is prevented.

According to the safety belt central adjuster of the invention, installation-fixing parts are arranged on the upper side and the lower side of the main body and each comprise a fixing hole located in the middle and adjustment notches located on the two sides, and the adjustment notches are internal arc notches. The overall position of the safety belt central adjuster can be locked through the fixing holes, and the adjustment notches are mainly used for pre-alignment and adjustment and are clamped on a child safety seat when the safety belt central adjuster needs to be installed on the child safety seat; the adjustment notches are round notches and thus can be adaptively adjusted, then the fixing holes are aligned for locking, and therefore, the safety belt central adjuster can be installed conveniently and rapidly and is stable and firm.

Compared with the prior art, the safety belt central adjuster of the invention has the advantages that:

1. The ratchet part used for locking the safety belt is composed of round sharp reverse teeth, when the safety belt is locked, the round sharp reverse teeth make contact with the safety belt, and force applied to the round sharp reverse teeth can be dispersed, so that the acting force applied to the ratchet part is reduced, fractures of the round sharp reverse teeth are prevented, and accordingly the whole safety belt central adjuster can be locked more firmly, has high strength, and can bear a force over 1000 pounds more uniformly.

2. The springs are provided with the outer clamping hook parts on the outer side of the spring and directly hooked on the two sides of the main body through the outer clamping hook parts, in this way, compared with the prior art, assembling is more convenient, and the production efficiency is improved; the two sides of the connecting piece are each provided with one spring, so that a dual protection effect is achieved, the whole safety belt central adjuster can still operate normally even if the spring on one side fails, accordingly, the reliability of the safety belt central adjuster in use is ensured, and the service life of the safety belt central adjuster is longer.

3. The outer end of the connecting piece is sleeved with the reinforced limiting component, so that the strength of the connecting piece is improved, and fractures are prevented; moreover, the springs are limited and fixed, friction and damage of the springs are avoided, and accordingly the locking reliability is ensured.

4. Users can adjust the length of the safety belt conveniently and rapidly by pressing the press plate when needed, the locking strength is further improved, and the locking effect is better; the structural design is simple and ingenious, the manufacturing cost is greatly reduced, and the reliability in use is extremely good.

DETAILED DESCRIPTION OF THE INVENTION

A further description of the technical scheme of the invention is given with specific embodiments and accompanying drawings of the invention as follows, however, the invention is not limited to the embodiments in the following description.

In FIGs: 1—main body; 11—installation fixing part; 11A—fixing hole; 11B—adjustment notch; 12—reinforced protrusion part; 12A—receding space; 12B—reinforced protrusion; 12C—hook groove; 13—lower concave arc part; 2—press plate; 21—operating part; 22—friction-increasing protrusion; 3—connecting piece; 4—lower guide groove; 5—lower guide arc edge; 6—spring mechanism; 7—spring; 71—sleeve part; 71A—spring winding; 71B—moving gap; 72—inner clamping stop lever part; 73—outer clamping hook part; 8—fixed through-hole; 81—first through-hole part; 82—second through-hole part; 83—pressing protrusion; 9—reinforced limiting component; 91—stop limiting part; 10—ratchet part; 111—lock space; 122—round sharp reverse teeth; 122A—first arc surface part; 122B—second arc surface part; 122C—round tooth part; 133—anti-disengaging chamfer; 14—first round sharp reverse tooth; 15—second round sharp reverse tooth; 16—third round sharp reverse tooth; 17—fourth round sharp reverse tooth; 18—fifth round sharp reverse tooth; 19—sixth round sharp reverse tooth; 20—seventh round sharp reverse tooth; 211—safety belt.

Figure 1:
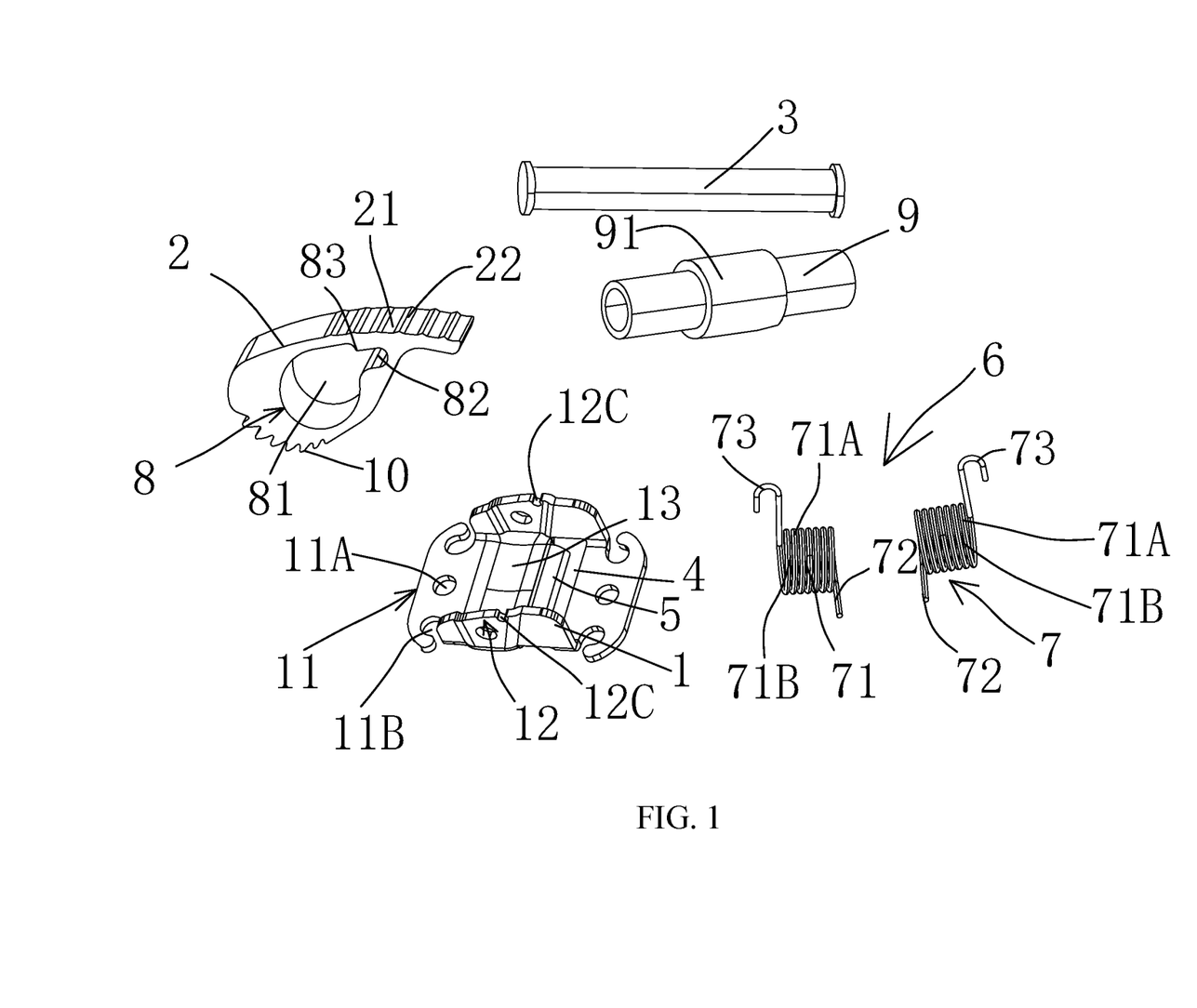
FIG. 1 is an exploded breakdown structural diagram of a safety belt central adjuster of the invention.
Figure 2:
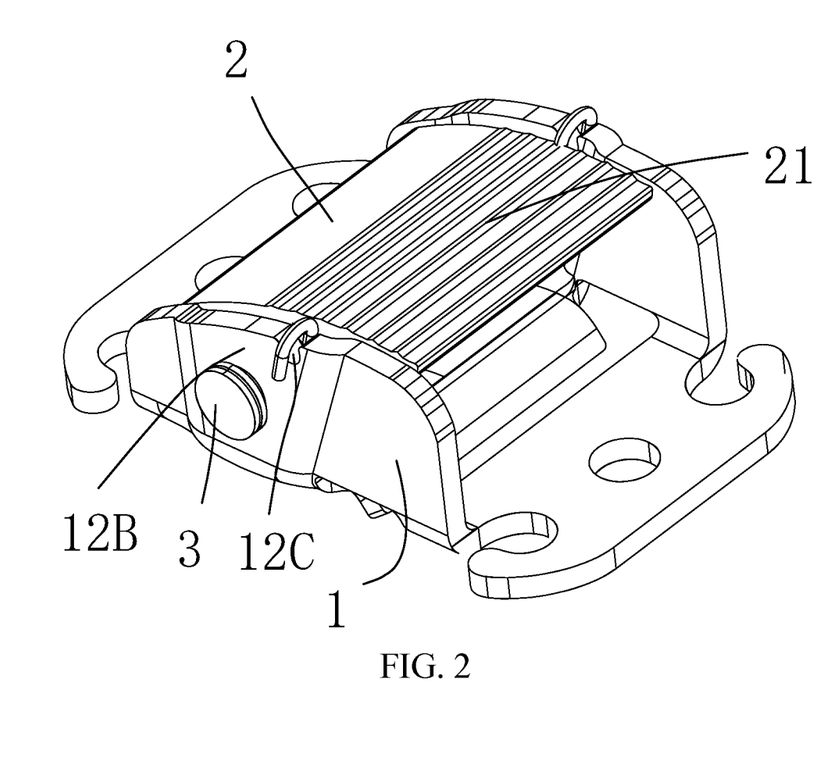
FIG. 2 is an integrated structural diagram of FIG. 1.

As is shown in FIG. 1 and FIG. 2, a safety belt central adjuster comprises a main body 1, a press plate 2 and a connecting piece 3, wherein the press plate 2 and the main body 1 are connected in a hinged mode through the connecting piece 3, and the press plate 2 can rotate around the connecting piece 3; a lower guide groove 4 is formed in the main body 1 and located on the guide-out side of the position where a safety belt 211 is locked, and a lower guide arc edge 5 is located on one side of the lower guide groove 4; the safety belt 211 can be guided to the lower end through the lower guide groove 4 so as to be adjusted and fixed conveniently. An operating part 21 is arranged on the upper side of the press plate 2 and provided with friction-increasing protrusions 22, and the friction force for operating the press plate 2 can be increased through the friction-increasing protrusions 22 so that thus the press plate 2 can be operated conveniently, and slipping is prevented. As is shown in FIG. 3, installation-fixing parts 11 are arranged on the upper side and the lower side of the main body 1 and each comprise a fixing hole 11A located in the middle and adjustment notches 11B located on the two sides, and the adjustment notches 11B are internal arc notches; the overall position of the safety belt central adjuster can be locked through the fixing holes 11A, and the adjustment notches 11B are mainly used for pre-alignment and adjustment; when the safety belt central adjuster needs to be installed on a child safety seat, the adjustment notches 11B are clamped onto the child safety seat, the adjustment notches 11B are arc notches and thus can be adaptively adjusted, then the fixing holes 11A are aligned for locking, and therefore, the safety belt central adjuster can be installed conveniently and rapidly and is stable and firm.

Figure 3:
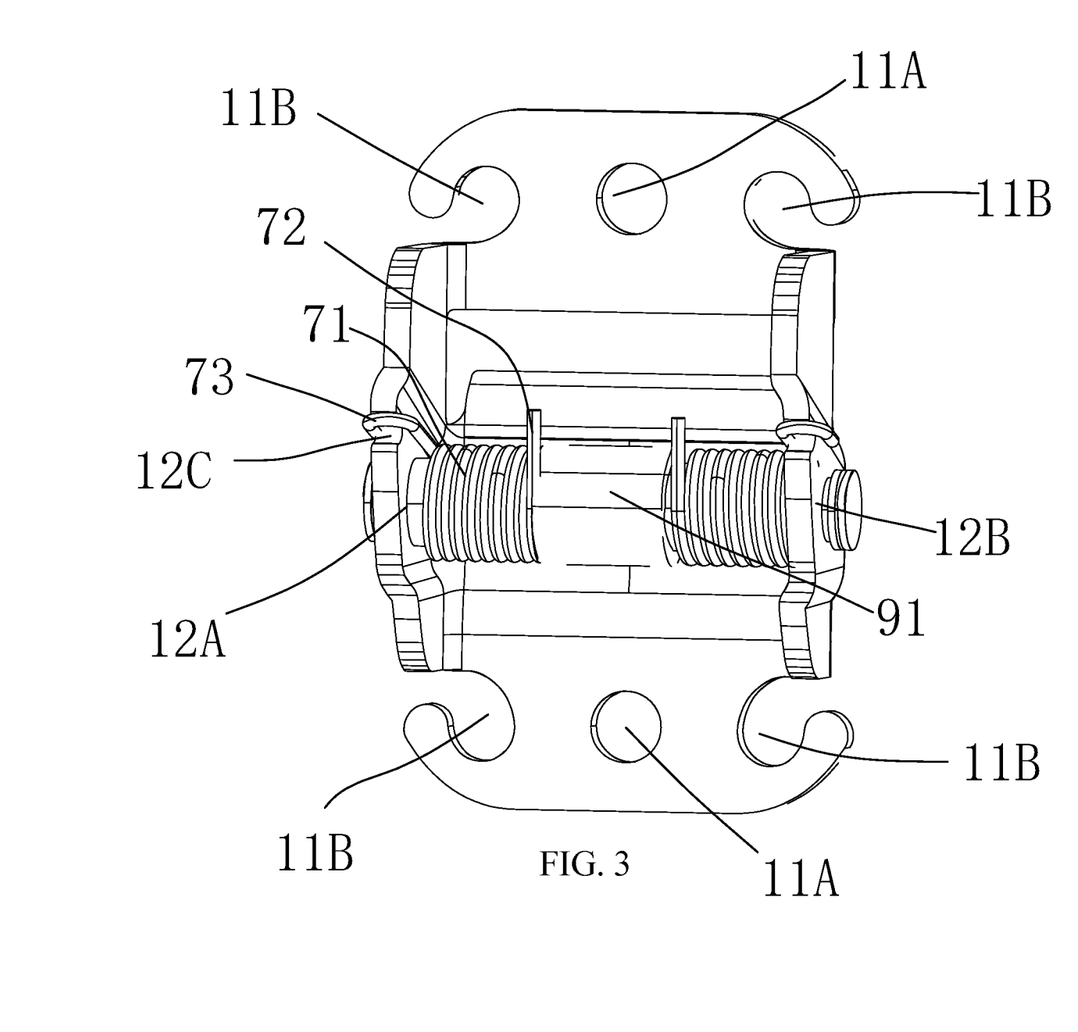
FIG. 3 is a structural diagram for installation of a main body, a spring and a connecting piece.

As is shown in FIG. 3, at least one spring mechanism 6 used for ensuring the tightening force of the press plate 2 is arranged at the hinged joint of the press plate 2 and the main body 1. As an optimization, for achieving a better effect, two spring mechanisms 6 used for ensuring the tightening force of the press plate 2 are arranged at the hinged joint of the press plate 2 and the main body 1 and each comprise a spring 7, and each spring 7 comprises a sleeve part 71, an inner clamping stop lever part 72 and an outer clamping hook part 73; the sleeve parts 71 are arranged on the connecting piece 3 in a sleeving mode, the inner clamping stop lever parts 72 are clamped on the press plate 2, and the outer clamping hook parts 73 are hooked on the two sides of the main body 1; the innovation lies in the arrangement of the springs 7, specifically, in the prior art, springs 7 are generally directly connected to a connecting piece 3 in a sleeving mode, then holes needs to be punched in a main body 1, and one outer ends of the springs 7 are stretch out from the holes; however, in the invention, the springs 7 are provided with the outer clamping hook parts 73 on the outer side and directly hooked on the two sides of the main body 1 through the outer clamping hook parts 73, and thus compared with the prior art in which the springs stretch out from the holes, the punching process is omitted, assembling is more convenient, and the production efficiency is improved. As an optimization of the invention, the two sides of the connecting piece 3 are each provide with one spring 7, so that a dual protection effect is achieved, the whole safety belt central adjuster can still operate normally even if the spring 7 on one side fails, accordingly, the reliability of the safety belt central adjuster in use is ensured, and the service life of the safety belt central adjuster is longer. Each sleeve part is composed of a plurality of spring windings 71A, moving gaps 71B are reserved between the adjacent spring windings 71A, and thus the springs 7 can still have good elasticity after being used repeatedly; the springs 7 can be movably adjusted through the moving gaps 71B, and thus the service life of the springs 7 can be remarkably prolonged.

Figure 4:
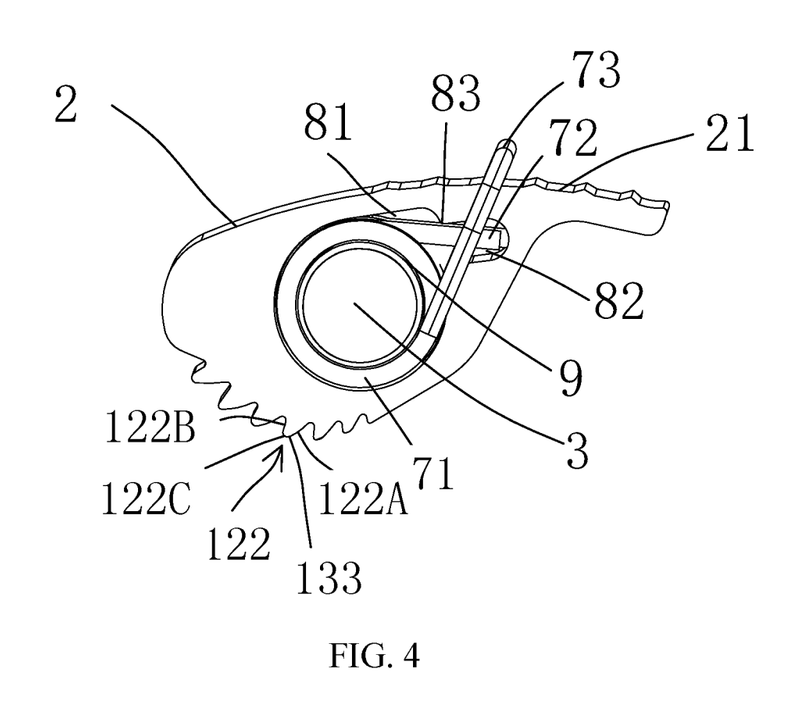
FIG. 4 is a structural diagram for matched installation of the connecting piece, the spring and a press plate.

As is shown in FIG. 4, a fixed through-hole 8 is formed in the press plate 2 and comprises a first through-hole part 81 and a second through-hole part 82 which are communicated with each other; the sleeve part 71 of each spring 7 is arranged on the connecting piece 3 in a sleeving mode and located in the first through-hole part 81 together with the connecting piece 3, the inner clamping stop lever part 72 of each spring 7 stretches to the second through-hole part 82, and a pressing protrusion 83 used for pressing down each inner clamping stop lever part 72 is arranged between the first through-hole part 81 and the second through-hole part 82. The first through-hole part 81 and the second through-hole part 82 are mainly used for conveniently mounting the connecting piece 3 and fixing the position of the inner clamping stop lever part 72 of each spring 7. For ensuring certain restoring force of each spring 7, both ends of the spring 7 need to be fixed, namely both the inner clamping stop lever part 72 and the outer clamping hook part 73 need to be fixed, the position of the inner clamping stop lever part 72 is fixed when the pressing protrusion 83 acts on the inner clamping stop lever part 72, and thus it is ensured that lock tightening force can be generated subsequently.

Figure 6:
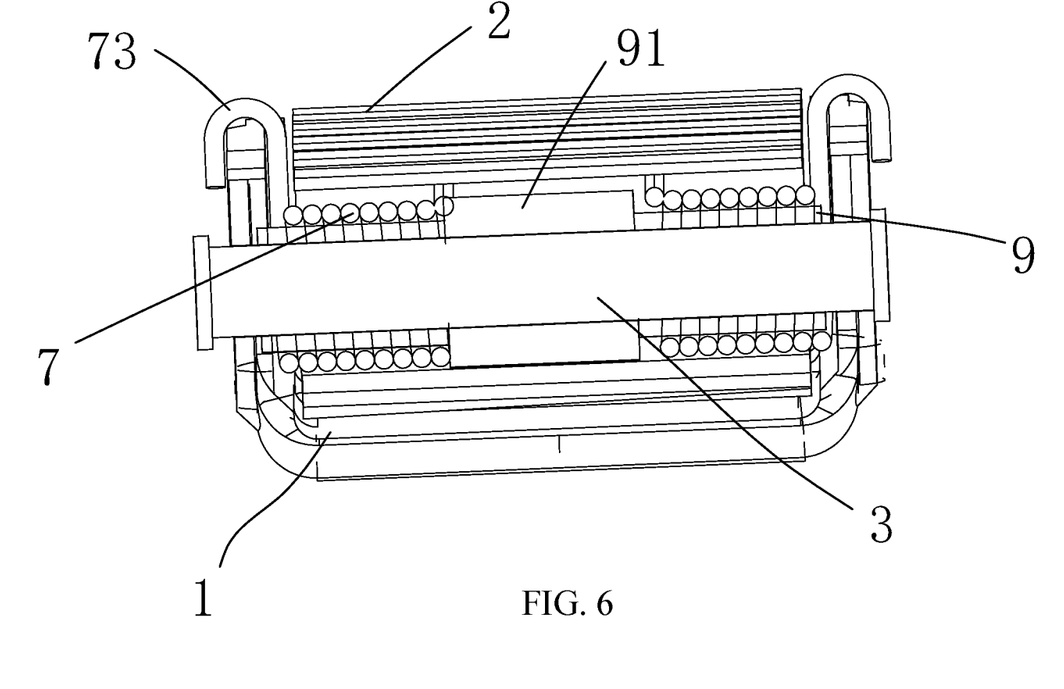
FIG. 6 is an internal structural diagram of the safety belt central adjuster of the invention.

As is shown in FIG. 4 and FIG. 6, a reinforced limiting component 9 is further arranged on the connecting piece 3 and is a plastic component, the reinforced limiting component 9 is arranged on the connecting piece 3 in a sleeving mode and located in the first through-hole part 81 together with the connecting piece 3, the reinforced limiting component 9 is sleeved with the sleeve part 71 of each spring 7, a stop limiting part 91 is arranged in the middle of the reinforced limiting component 9, and the inner side of each sleeve part 71 abuts against the stop limiting part 91. The connecting piece 3 needs to be rotated repeatedly in use, and for improving the strength of the connecting piece 3, the outer end of the connecting piece 3 is sleeved with the reinforced limiting component 9; the reinforced limiting component 9 mainly has two functions, for one function, the strength of the connecting piece 3 is improved, and fractures are prevented; for the other function, the springs 7 are prone to sliding along the connecting piece 3 in use due to the fact that the inner sides of the springs 7 are not limited, however, by adoption of the stop limiting part 91, the springs 7 can be stopped, the positions of the springs 7 are limited and fixed, and thus the locking reliability is ensured.

As is shown in FIG. 3 and FIG. 2, reinforced protrusion parts 12 are formed on the two sides of the main body 1, receding spaces 12A are formed between the inner sides of the reinforced protrusion parts 12 and the press plate 2, and reinforced protrusions 12B are arranged outside the reinforced protrusion parts 12; the reinforced protrusion parts 12 are provided with hook grooves 12C, and the outer clamping hook parts 73 are hooked in the hook grooves 12C; the reinforced protrusion parts 12 mainly have two functions, for one function, the receding spaces 12A are formed, and thus the outer clamping hook parts 73 can smoothly stretch out from the receding spaces 12A when the springs 7 are installed; for the other function, the strength of the main body 1 is improved; the hook grooves 12C are mainly used for fixing the outer clamping hook parts 73 of the springs 7, the inner clamping stop lever parts 72 of the springs 7 are fixed through the second through-hole part 82, in this way, under the condition that both ends of each spring 7 are fixed, elastic tightening force can be generated and acts on the press plate 2, and thus the safety belt 211 is locked.

Figure 5:
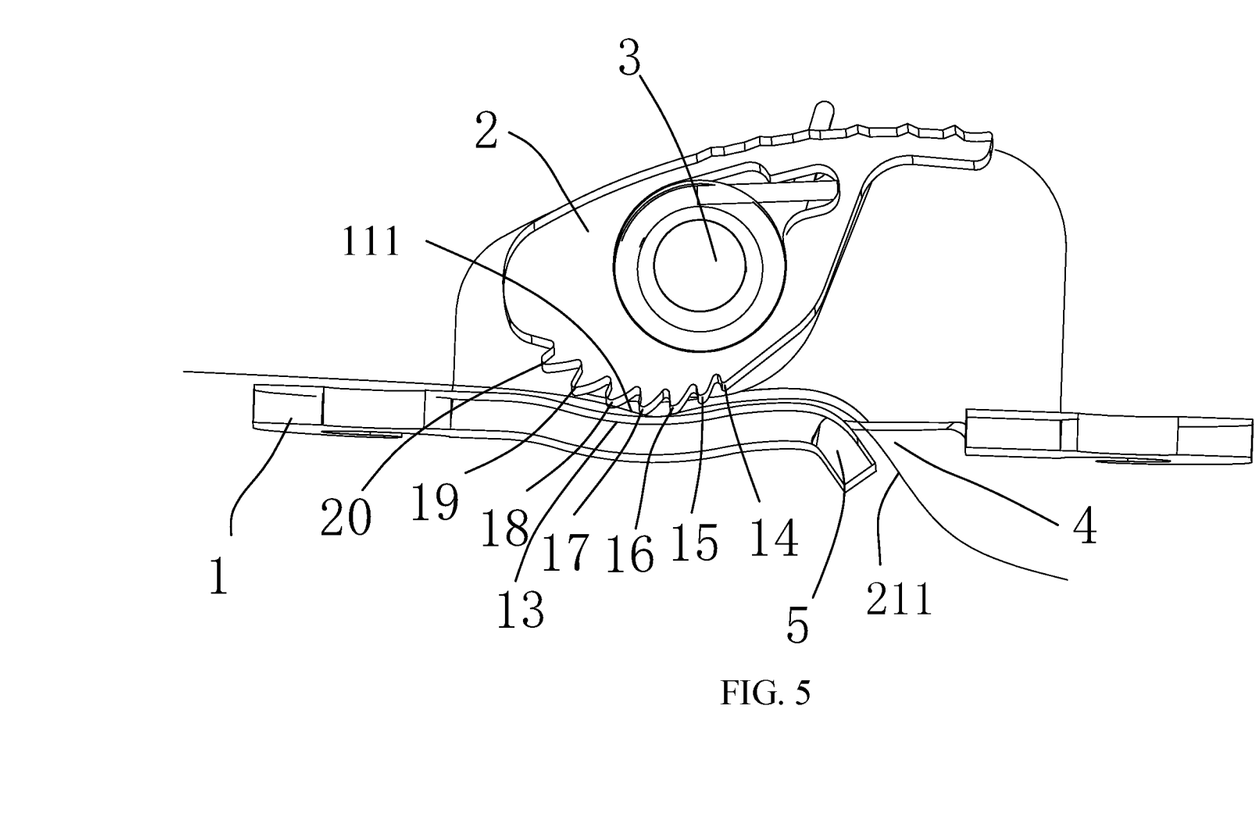
FIG. 5 is a matched structural diagram of a safety belt and round sharp reverse teeth after the safety belt stretches into a ratchet part.

As is shown in FIG. 5, FIG. 4 and FIG. 1, a ratchet part 10 is arranged at the lower end of the press plate 2 and provided with round sharp reverse teeth 122; the safety belt central adjuster has a locked state and a released state when the safety belt 211 stretches into the safety belt central adjuster; when the safety belt central adjuster is in the locked state, a lock space 111 used for locking the position of the safety belt 211 is formed between the ratchet part 10 and the upper surface of the main body 1, the safety belt central adjuster is switched to the released state when external force is applied to the press plate 2, the ratchet part 10 can disengage from the main body 1, and a channel allowing the safety belt 211 to stretch therein is formed between the ratchet part 10 and the main body 1. The safety belt central adjuster of the invention is mainly installed in the middle of the front end of a child safety seat in use and mainly used for locking and releasing the safety belt 211 when the length of the safety belt 211 is adjusted; as the press plate 2 and the main body 1 are connected in the hinged mode through the connecting piece 3, the press plate 2 is operated to be switched into the released state from the locked state first, the length of the safety belt 211 is adjusted after the safety belt 211 stretches into the channel, the press plate 2 is released after the safety belt 211 is adjusted to the proper length, and then the press plate 2 can generate restoring force and return to the locked state under the effect of the spring mechanism 6. One innovation of the invention lies in that the ratchet part 10 is located at the position, where the safety belt 211 is locked, of the lower end of the press plate 2. However, in the prior art, sharp teeth are generally adopted, as the sharp teeth are extremely pointed, all force is concentrated on the sharp teeth when the sharp teeth make contact with the safety belt 211, each sharp tooth is actually a point and is prone to being broken when force is applied to the point, and consequentially, the whole position where the safety belt 211 is locked is weak. In the patent, the ratchet part 10 is adopted, namely the ratchet part 10 is an arc and has a certain anti-disengaging chamfer when making contact with the safety belt 211, when the arc teeth make contact with the safety belt 211, force applied to the arc points can be dispersed, so that acting force applied to the ratchet part 10 is reduced, and the whole safety belt central adjuster can be locked more firmly and has high strength; in this way, users can adjust the safety belt 211 only by pressing or releasing the press plate 2, operation is simple, and the working efficiency is high.

A lower concave arc part 13 is arranged on the portion, matched with the ratchet part 10, of the upper surface of the main body 1, and the lower surface of the main body 1 protrudes outwards to form the lower concave arc part 13; a lock space 111 used for locking the position of the safety belt is formed between the lower concave arc part 13 and the ratchet part 10, and when the safety belt central adjuster is in the locked state, the safety belt is locked on the lower concave arc part 13 by the ratchet part 10. The ratchet part 10 comprises a plurality of round sharp reverse teeth 122, the multiple round sharp reverse teeth 122 are arranged obliquely to form an anti-disengaging chamfer 133, and the safety belt disengages out in the direction of the anti-disengaging chamfer 133. When the safety belt central adjuster is in the locked state, the safety belt is locked on the lower concave arc part 13 by least three round sharp reverse teeth in the middle. In total, the ratchet part 10 includes seven round sharp reverse teeth, namely the first round sharp reverse tooth 14, the second round sharp reverse tooth 15, the third round sharp reverse tooth 16, the fourth round sharp reverse tooth 17, the fifth round sharp reverse tooth 18, the sixth round sharp reverse tooth 19 and the seventh round sharp reverse tooth 20, and when the safety belt central adjuster is in the locked state, the safety belt is locked on the lower concave arc part 13 by the third round sharp reverse tooth 16, the fourth round sharp reverse tooth 17 and the fifth round sharp reverse tooth 18. Each round sharp reverse tooth is composed of a first arc surface part 122A, a second arc surface part 122B and a round tooth part 122C, wherein the arc length of the second arc surface part 122B is greater than that of the first arc surface part 122A, and the round tooth part 122C is connected between the first arc surface part 122A and the second arc surface part 122B; in this way, the round tooth parts 122C with arcs of all the round sharp reverse teeth can be formed, force can be dispersed when applied to the round tooth parts 122C, the acting force applied to the round tooth parts 122C is reduced accordingly, and the whole safety belt central adjuster can be locked more firmly and has high strength.

Figure 7:
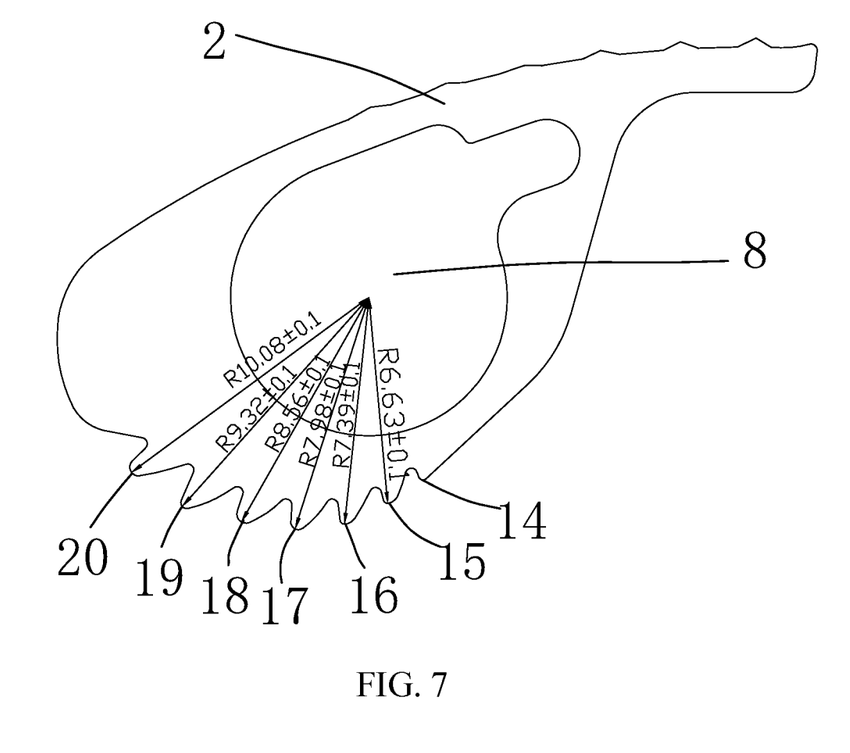
FIG. 7 is a structural diagram of the arrayed round sharp reverse teeth of the ratchet part.

As is shown in FIG. 7, the distances from the round tooth parts 122C of the seven round sharp reverse teeth to the center of the fixed through-hole 8 are sequentially increased from left to right, specifically, the distance from the round tooth part 122C of the second round sharp reverse tooth 15 to the center of the fixed through-hole is 6.63+/−0.1, the distance from the round tooth part 122C of the third round sharp reverse tooth 16 to the center of the fixed through-hole is 7.39+/−0.1, the distance from the round tooth part 122C of the fourth round sharp reverse tooth 17 to the center of the fixed through-hole is 7.98+/−0.1, the distance from the round tooth part 122C of the fifth round sharp reverse tooth 18 to the center of the fixed through-hole is 8.56+/−0.1, the distance from the round tooth part 122C of the sixth round sharp reverse tooth 19 to the center of the fixed through-hole is 9.32+/−0.1, and the distance from the round tooth part 122C of the seventh round sharp reverse tooth 20 to the center of the fixed through-hole is 10.08+/−0.1. As the distances from the round tooth parts 122C of the seven round sharp reverse teeth to the center of the fixed through-hole 8 are sequentially decreased from left to right, a certain anti-disengaging chamfer is formed by the round sharp reverse teeth, the engaging force of the whole round sharp reverse teeth is enhanced, and accordingly the safety belt central adjuster can bear higher force more uniformly.

The innovation of the invention lies in that when the safety belt central adjuster is in the locked state, the safety belt is locked on the lower concave arc part 13 by at least three round sharp reverse teeth in the middle, and the arc shape of the lower concave arc part 13 is kept consistent with that of the arc surface formed by the multiple round sharp reverse teeth 122 of the ratchet part at the lower end of the press plate 2. In the prior art, two teeth generally act on the safety belt; however, in the invention, a safe lock position can be ensured through the lower concave arc part 13, and meanwhile, the three round sharp reverse teeth 122 in the middle act on the safety belt, so that the overall strength is higher, and the position of the safety belt 211 is locked; the other round sharp reverse teeth on the two sides can prevent the safety belt 211 from disengaging out, so that the locking reliability and stability are ensured; moreover, the multiple round sharp reverse teeth 122 are arranged obliquely to the anti-disengaging chamfer 133 and can obliquely act on the safety belt, and the safety belt disengages out right in the inclination direction of the round sharp reverse teeth 122, so that the locking effect is better. Users can conveniently and rapidly adjust the length of the safety belt only by pressing the press plate 2 when needed, the locking strength is further improved, the safety belt central adjuster can bear a force over 1000 pounds more uniformly, and the locking effect is better; the safety belt central adjuster is simple and ingenious in structural design, the manufacturing cost is greatly reduced, and the reliability in use is extremely good.

The specific embodiment in the above description is only used for illustratively describing the spirit of the invention. Various modifications or supplements or similar substitutes can be made by those skilled in the technical field according to the specific embodiment in the above description within the scope defined by the spirit of the invention.

What is claimed is:

1. A safety belt central adjuster, comprising a main body, a press plate and a connecting piece, wherein the press plate and the main body are connected in a hinged mode through the connecting piece, and the press plate can rotate around the connecting piece; wherein at least one spring mechanism used for ensuring tightening force of the press plate is arranged at a hinged joint of the press plate and the main body, and a ratchet part is arranged at a lower end of the press plate and provided with round sharp reverse teeth; the safety belt central adjuster has a locked state and a released state when a safety belt stretches into the safety belt central adjuster; when the safety belt central adjuster is in the locked state, a lock space used for locking position of the safety belt is formed between the ratchet part and an upper surface of the main body, the safety belt central adjuster is switched to the released state when external force is applied to the press plate, the ratchet part can disengage from the main body, and a channel allowing the safety belt to stretch therein is formed between the ratchet part and the main body;

two spring mechanisms used for ensuring the tightening force of the press plate are arranged at the hinged joint of the press plate and the main body and each comprise a spring, and each of the spring comprises a sleeve part, an inner clamping stop lever part and an outer clamping hook part; the sleeve parts are arranged on the connecting piece in a sleeving mode, the inner clamping stop lever parts are clamped on the press plate, and the outer clamping hook parts are hooked on two sides of the main body; each of the sleeve part is composed of a plurality of spring windings, and moving gaps are reserved between the adjacent spring windings.

2. The safety belt central adjuster according to claim 1, wherein a lower concave arc part is arranged on a portion, matched with the ratchet part, of the upper surface of the main body, and a lower surface of the main body protrudes outwards to form the lower concave arc part; the lock space used for the locking position of the safety belt is formed by the lower concave arc part and the ratchet part, an arc shape of the lower concave arc part is kept consistent with that of an arc surface formed by the round sharp reverse teeth of the ratchet part at the lower end of the press plate, and when the safety belt central adjuster is in the locked state and stressed state, the safety belt is locked on the lower concave arc part by the ratchet part.

3. The safety belt central adjuster according to claim 2, wherein the ratchet part comprises a plurality of the round sharp reverse teeth, the round sharp reverse teeth are arranged obliquely to form an anti-disengaging chamfer, the safety belt disengages out in a direction of the anti-disengaging chamfer, and when the safety belt central adjuster is in the locked state and the stressed state, the safety belt is locked on the lower concave arc part by at least three of the round sharp reverse teeth in a middle.

4. The safety belt central adjuster according to claim 3, wherein each of the round sharp reverse tooth is composed of a first arc surface part, a second arc surface part and a round tooth part, wherein an arc length of the second arc surface part is greater than that of the first arc surface part, and the round tooth part is connected between the first arc surface part and the second arc surface part.

5. The safety belt central adjuster according to claim 4, wherein the ratchet part totally includes seven round sharp reverse teeth, namely first round sharp reverse tooth, second round sharp reverse tooth, third round sharp reverse tooth, fourth round sharp reverse tooth, fifth round sharp reverse tooth, sixth round sharp reverse tooth and seventh round sharp reverse tooth, and when the safety belt central adjuster is in the locked state and the stressed state, the safety belt is locked on the lower concave arc part by the third round sharp reverse tooth, the fourth round sharp reverse tooth and the fifth round sharp reverse tooth.

6. The safety belt central adjuster according to claim 5, wherein distances from the round tooth parts of the seven round sharp reverse teeth to center of a fixed through-hole are sequentially increased from left to right, specifically, the distance from the round tooth part of the second round sharp reverse tooth to the center of the fixed through-hole is 6.63+/−0.1, the distance from the round tooth part of the third round sharp reverse tooth to the center of the fixed through-hole is 7.39+/−0.1, the distance from the round tooth part of the fourth round sharp reverse tooth to the center of the fixed through-hole is 7.98+/−0.1, the distance from the round tooth part of the fifth round sharp reverse tooth to the center of the fixed through-hole is 8.56+/−0.1, the distance from the round tooth part of the sixth round sharp reverse tooth to the center of the fixed through-hole is 9.32+/−0.1, and the distance from the round tooth part of the seventh round sharp reverse tooth to the center of the fixed through-hole is 10.08+/−0.1.

7. The safety belt central adjuster according to claim 1, wherein a fixed through-hole is formed in the press plate and comprises a first through-hole part and a second through-hole part which are communicated with each other, the sleeve part of each of the spring is arranged on the connecting piece in the sleeving mode and located in the first through-hole part together with the connecting piece, the inner clamping stop lever part of each of the spring stretches to the second through-hole part, and a pressing protrusion used for pressing down each inner clamping stop lever part is arranged between the first through-hole part and the second through-hole part.

8. The safety belt central adjuster according to claim 7, wherein a reinforced limiting component is further arranged on the connecting piece, the reinforced limiting component is arranged on the connecting piece in the sleeving mode and located in the first through-hole part together with the connecting piece, and the sleeve part of each of the spring is arranged on the reinforced limiting component in the sleeving mode; a stop limiting part is located in a middle of the reinforced limiting component, and an inner side of each sleeve part abuts against the stop limiting part.

9. The safety belt central adjuster according to claim 1, wherein reinforced protrusion parts are formed on the two sides of the main body, receding spaces are formed between inner sides of the reinforced protrusion parts and the press plate, and reinforced protrusions are formed outside the reinforced protrusion parts; the reinforced protrusion parts are provided with hook grooves, and the outer clamping hook parts are hooked in the hook grooves; a lower guide groove is further formed in the main body and located on a guide-out side of the position where the safety belt is locked, and a lower guide arc edge is located on one side of the lower guide groove; an operating part is arranged on an upper side of the press plate and provided with friction increasing protrusions; installation fixing parts are arranged on the upper side and a lower side of the main body and each comprise a fixing hole located in a middle and adjustment notches located on the two sides, and the adjustment notches are arc notches internally.

\* \* \* \* \*